(12) United States Patent
Schramm et al.

(10) Patent No.: US 11,697,943 B2
(45) Date of Patent: Jul. 11, 2023

(54) FORMWORK TIE

(71) Applicant: MEVA Schalungs-Systeme GmbH, Haiterbach (DE)

(72) Inventors: Uwe Schramm, Horb-Muhringen (DE); Rick Schille, Haiterbach (DE)

(73) Assignee: MEVA Schalungs-Systeme GmbH, Haiterbach (DE)

( * ) Notice: Subject to any disclaimer, the term of this patent is extended or adjusted under 35 U.S.C. 154(b) by 8 days.

(21) Appl. No.: 17/381,336

(22) Filed: Jul. 21, 2021

(65) Prior Publication Data

US 2022/0042329 A1 Feb. 10, 2022

(30) Foreign Application Priority Data

Aug. 4, 2020 (EP) .................................... 20189416

(51) Int. Cl.
*E04G 17/065* (2006.01)

(52) U.S. Cl.
CPC ....... *E04G 17/065* (2013.01); *E04G 17/0652* (2013.01); *E04G 17/0655* (2013.01)

(58) Field of Classification Search
CPC ............ E04G 17/0655; E04G 17/0652; E04G 17/065; F16B 39/04; F16B 39/10; F16B 39/32

See application file for complete search history.

(56) References Cited

U.S. PATENT DOCUMENTS

| | | | |
|---|---|---|---|
| 2,270,448 A | 1/1942 | Juhl | |
| 8,272,620 B2* | 9/2012 | Schwoerer | E04G 17/0752 249/40 |
| 9,222,271 B2* | 12/2015 | Amon | E04G 17/16 |
| 9,708,820 B2* | 7/2017 | Berger | E04G 17/0652 |
| 10,662,660 B2* | 5/2020 | Colino Vega | F16B 21/02 |
| 10,808,413 B2* | 10/2020 | Colino Vega | E04G 17/0652 |
| 11,047,144 B2* | 6/2021 | Colino Vega | E04G 17/0657 |
| 2012/0304570 A1 | 12/2012 | Bernd | |

FOREIGN PATENT DOCUMENTS

| | | |
|---|---|---|
| CH | 485 097 A | 1/1970 |
| DE | 10 2010 002 108 A1 | 8/2011 |
| DE | 10 2018 107081 A1 | 9/2019 |
| EP | 3 385 469 A1 | 10/2018 |
| IT | 2018 0009 6063 A1 | 12/2019 |

OTHER PUBLICATIONS

European Search Report for corresponding Application No. 20 18 9416, dated Jan. 18, 2021.

* cited by examiner

*Primary Examiner* — Michael Safavi
(74) *Attorney, Agent, or Firm* — Renner, Otto, Boisselle & Sklar, LLP

(57) ABSTRACT

A tie nut of a formwork tie for connecting two formwork elements is secured on a tie rod to prevent inadvertent rotation by way of a form fit coupling that can be axially made to engage therewith.

11 Claims, 2 Drawing Sheets

FORMWORK TIE

CROSS-REFERENCE TO RELATED APPLICATION

This application claims priority under 35 USC § 119 to European Application No. 20 189 416.9, filed Aug. 4, 2020, the entire disclosure of which is incorporated herein by reference.

TECHNICAL FIELD

The present invention relates to a formwork tie for connecting two formwork elements, which are disposed at a distance opposite one another.

DISCUSSION OF RELATED ART

Concrete formwork elements, or formwork elements for short, are used for pouring concrete walls. For this purpose, formwork elements are disposed at a normally constant distance, which corresponds to the thickness of the wall to be poured, opposite one another. The formwork elements typically comprise a board made of (ply)wood or plastic as a formwork shell and a planar panel made of longitudinally and transversely, or horizontally and vertically, extending steel or aluminum profiles for reinforcement on a rear side of the formwork shell. For pouring the concrete, the formwork elements are disposed at a distance from one another, with the formwork shells thereof facing one another. So as to hold the formwork elements against the pressure of free-flowing concrete poured in between, these are connected by formwork ties, which comprise tie rods, including external threads, at both ends, which are placed through insertion holes in the formwork elements disposed opposite one another, and onto the external threads of which tie nuts are screwed, on the rear sides of the formwork elements which face away from one another, the tie nuts holding the formwork elements at a distance with respect to one another. As an example, reference is made to a formwork tie that is known from the unexamined patent application DE 10 2010 002 108 A1.

So as to fix the tie nut non-rotatably on the tie rod, the tie nut of a formwork tie known from the Swiss patent specification CH 485 097 includes a transverse slot in which a slide, including a keyhole-shaped hole, is accommodated. The tie rod of the known formwork tie has flattened regions in the area of the two external threads thereof, which form parallel surfaces, extending in the longitudinal direction of the tie rod, on opposing circumferential locations of the tie rod. When the slide is displaced in the tie nut so that a narrow end of the keyhole-shaped hole is situated on the tie rod, the narrow end of the keyhole-shaped hole of the slide holds the tie nut non-rotatably on the tie rod as a result of form fit with the parallel surfaces of the tie rod, whereby the tie nut is also axially fixed on the tie rod and holds formwork elements at a distance with respect to one another. When the tie rod is situated in a round portion of the keyhole-shaped hole, the tie nut can be rotated on the tie rod and, as a result, be axially set on the tie rod. Instead of the slide including the keyhole-shaped hole, the tie nut of the known formwork tie can also comprise a slide that is eccentrically disposed in a transverse lot of the tie nut and, by displacement, can be made to bear against one of the two parallel surfaces of the tie rod, so as to hold the tie nut, by way of form fit at the parallel surfaces, non-rotatably on the tie rod.

The European patent application EP 3 385 469 A1 discloses a similar design, in which a likewise eccentric slide is transversely displaceably disposed in an opening of a sleeve, which is disposed on the tie rod instead of the tie nut. The tie rod of the formwork tie includes an external thread at one end, and circumferential ribs, which are interrupted by two parallel surfaces on opposing circumferential locations of the tie rod, at another end. The sleeve includes grooves, which are complementary to the circumferential ribs of the tie rod, on opposing circumferential locations of an axial through-hole, so that the sleeve can be rotated into a position in which this is axially displaceable on the tie rod. As a result of a rotation of the sleeve on the tie rod by 90°, the grooves of the sleeve are made to engage on the ribs of the tie rod, and hold the sleeve on the tie rod in an axially fixed manner. In this rotational position of the sleeve, the slide can be displaced in the sleeve transversely to the tie rod so as to bear against one of the two parallel surfaces and hold the sleeve non-rotatably on the tie rod by way of form fit with the one parallel surface. The sleeve is thus secured to prevent inadvertent rotation.

SUMMARY OF THE INVENTION

It is the object of the invention to provide a formwork tie of the above-described type, including an alternative anti-rotation mechanism for a tie nut on a tie rod.

The formwork tie according to the invention comprises a tie rod including an external thread and a tie nut, which can be screwed, or is screwed, onto the external thread. The external thread preferably extends from one end across a length of the tie rod which allows a distance of the formwork elements to be set in a predefined wall thickness range. The external thread can start at the end of the tie rod or is situated at a distance of, for example, one to three diameters of the tie rod from the end of the tie rod.

At an opposite end, the tie rod can likewise include an external thread for screwing on a second tie nut, or for screwing the tie rod into a tie nut, or, generally speaking, an internal thread of a formwork tie.

The formwork tie according to the invention furthermore comprises an anti-rotation element, which is non-rotatable and axially movable with respect to the tie rod, and a releasable form fit coupling, by way of which the anti-turn element can be releasably non-rotatably connected to the tie nut and which can be made to engage and disengage by an axial movement. "Engaged" shall be understood to mean that the form fit coupling non-rotatably connects the tie nut to the anti-rotation element by way of form fit, whereby the tie nut is non-rotatably connected to the tie rod via the form fit coupling and the anti-rotation element. The tie nut can thus be secured in the position thereof on the tie rod to prevent inadvertent adjustment. "Disengaged" shall be understood to mean that the form fit coupling does not connect the tie nut to the anti-rotation element, so that the tie nut can be axially adjusted on the tie rod by rotation on the external thread of the tie rod.

In addition to two-sided anchoring, in which rear sides, facing away from one another, of two formwork elements disposed at a distance from one another are accessible, and in which the tie rod is placed through at least approximately aligned insertion holes in the two formwork elements and tie nuts are screwed onto the tie rod at the rear sides of the two formwork elements which face away from one another, the formwork tie according to the invention is also suitable for installation by insertion, with a concrete wall formwork only being accessible from one side. In this case, the wall thickness of the wall to be poured is set by rotating the tie nut on the tie rod, and the tie nut is fixed on the tie rod by engagement of the form fit coupling. The tie rod is placed from the rear side of an accessible formwork element through the at least approximately mutually aligned insertion holes of the two formwork elements that are disposed at a distance from one another, and are screwed into a tie nut or, generally speaking, an internal thread at an inaccessible formwork element. The tie nut of the formwork tie is secured at the rear side of the accessible formwork element.

The tie nut and the anti-rotation element are preferably designed as complementary parts of the form fit coupling, which is to say that the tie nut and the anti-rotation element also form the form fit coupling, or parts of the form fit coupling, which can comprise further parts.

So as to hold the anti-rotation element non-rotatably on the tie rod by way of form fit, according to an embodiment of the invention the tie rod has a non-circular cross-section at least in an axial section in which the anti-rotation element can be displaced for setting the distance of the two formwork elements, the non-circular cross-section making the non-rotatability of the anti-rotation element possible by way of form fit at the cross-section of the tie rod. In embodiments of the invention, it must be taken into consideration that the external thread for the tie nut is also situated in this axial section of the tie rod, and in this case, the non-circular cross-section should also be suitable for the external thread. One option for such a non-circular cross-section is the flattened regions known from the prior art, which form two parallel surfaces, extending axially parallel to the tie rod, at opposing circumferential locations of the tie rod. Such a non-circular cross-section is also possible with only one or more tangential surfaces, extending axially parallel to the tie rod, at one or more circumferential locations of the tie rod. For example, one or more longitudinal grooves in the tie rod are also possible, at least in the region of the external thread, in which a wedge, a nose or the like of the anti-rotation element engages. The list is by way of example and not exhaustive.

According to an embodiment of the invention, the anti-rotation element comprises a sleeve that is axially displaceable on the tie rod. An inner cross-section of the sleeve corresponds to the non-circular cross-section of the tie rod, so that a form fit of the two cross-sections holds the sleeve non-rotatably on the tie rod. The inner cross-section of the sleeve can be the mirror opposite of the cross-section of the tie rod. However, there is also the option of using different cross-sections of the tie rod and the sleeve, which cause the non-rotatability by way of form fit.

The tie nut and the anti-rotation element of the formwork tie according to the invention can, for example, comprise spur teeth at mutually facing end faces or be designed in the manner of a dog clutch. According to an embodiment of the invention, the tie nut includes a cut-out in the end face, which faces the anti-rotation element and is open at the end face. The anti-rotation element comprises a protrusion, corresponding to the cut-out, at the end face facing the tie nut and/or at a circumference, which enters the cut-out of the tie nut by displacement of the anti-rotation element with respect to the tie nut, and thereby non-rotatably connects the tie nut to the anti-rotation element by way of form fit between the protrusion and the cut-out, the anti-rotation element in turn being non-rotatable with respect to the tie rod by way of form fit. The tie nut and/or the anti-rotation element can also include several such cut-outs and protrusions evenly or unevenly distributed over the circumference. Conversely, the protrusion or protrusions can also be provided at the tie nut, and the cut-out or cut-outs can be provided at the anti-rotation element. A combination of cut-outs and protrusions, evenly or unevenly distributed over the circumference, at the end faces facing one another of both the tie nut and the anti-rotation element, is also possible.

An embodiment of the invention provides an axially parallel, or possibly obliquely or helically, extending slot in the end face of the tie nut, or of the anti-rotation element, which faces the anti-rotation element or the tie nut, and a wing, rib, pin or the like, complementary to the slot, at the end face facing the tie nut or the anti-rotation element, and/or at the circumference of the anti-rotation element or of the tie nut, which finds its way into the slot when the anti-rotation element is pushed to the tie nut, so that the wing, the rib, the pin or the like connects the tie nut non-rotatably to the anti-rotation element by way of form fit in the slot. Again, several slots and/or wings, ribs, pins or the like can be evenly or unevenly distributed over the circumference, and/or both the tie nut and the anti-rotation element include both slots and wings, ribs, pins or the like.

According to a preferred embodiment of the invention, the form fit coupling can be made to engage at established angular steps of, in particular, 60°, 90°, 120°, 180° or 360°. The tie nut can thus be secured on the tie rod at the angular steps to prevent rotation. This allows the tie nut to be axially secured on the tie rod in corresponding fractions of the lead of the external thread of the tie rod. If the tie nut is non-rotatably secured on the tie rod at angular steps of 120° or 180°, for example, this may be axially secured on the tie rod after a respective third or half a turn.

According to an embodiment of the invention, a releasable securing element is provided, which releasably holds the form fit coupling in engagement and secures this to prevent inadvertent release. The securing element can comprise a spring shackle, for example, which can be snapped laterally onto the tie nut and/or onto the anti-rotation element, and which holds the form fit coupling in engagement when snapped on and the form fit coupling is engaged.

All of the features mentioned in the description and/or shown in the drawing can be implemented individually alone or in any arbitrary combination in embodiments of the invention. Embodiments of the invention that do not comprise all, but only some of the features of a claim, including of the independent claim, are possible.

BRIEF DESCRIPTION OF THE DRAWINGS

The invention will be described hereafter in greater detail based on one exemplary embodiment shown in the drawings. In the drawings.

DETAILED DESCRIPTION OF THE EMBODIMENTS

Figure 1:
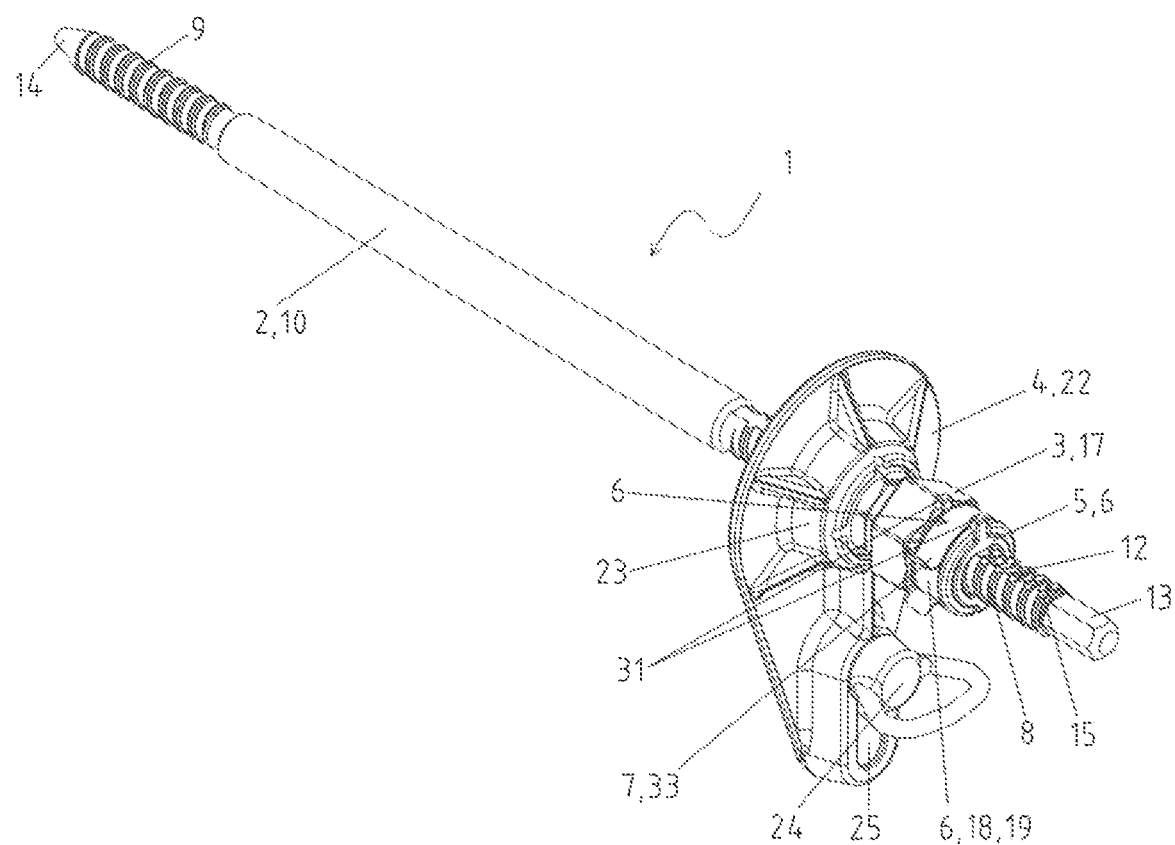
FIG. 1 shows a formwork tie according to the invention in a perspective illustration.

The formwork tie 1 according to the invention shown in FIG. 1 is intended for connecting two formwork elements, which are not shown and disposed opposite and at a distance from one another. The formwork elements comprise a board made of (ply)wood or plastic as a formwork shell and a panel made of longitudinally and transversely, or horizontally and vertically, extending profiles made of steel or aluminum on a rear side for reinforcing the formwork shell. The rear side is the side of the formwork shell at which the panel is disposed. The two formwork elements are set up with the formwork shells thereof facing one another.

The formwork tie 1 comprises a tie rod 2, a tie nut 3, an abutment 4, an anti-rotation element 5, a form fit coupling 6, and a securing element 7.

The tie rod 2 includes two external threads 8, 9, between which a smooth-walled, conical rod section 10 is situated. The external threads 8, 9 can have different diameters and/or different leads, and the external threads 8, 9 are preferably identical so that these can be screwed into identical internal threads. The tie nut 3 can be screwed, or is screwed, onto the external thread 8 at an end of the conical rod section 10 which has a larger diameter, the tie nut for this purpose including an axial through-hole 11 including an internal thread, which is not visible in the drawing. A hexagon 13, with which the tie rod 2 ends, adjoins the external thread 8 of the tie rod 2. At an opposite end, the tie rod 2 ends with a frustum-shaped tip 14. A wrench, such as an open-ended wrench, which is not shown, can be placed on the hexagon 13 for rotating the tie rod 2.

In the region of the external thread 8 onto which the tie nut 3 can be screwed or is screwed, the tie rod 2 comprises two flattened regions at opposing circumferential locations, which form two mutually opposing parallel surfaces 15 at the opposing circumferential locations of the tie rod 2. The two parallel surfaces 15 extend axially parallel to the tie rod 2, as deep as, or slightly deeper than, a base between turns of the external thread 8 of the tie rod 2, so that turns of the external thread 8 are interrupted in the region of the parallel surfaces 15.

A scale 12 is provided at one of the two parallel surfaces 15 of the tie rod 2, which corresponds to a reference plane at an established location in a longitudinal direction of the tie rod 2 and to the tie nut 3. The reference plane is situated at an annular step, for example, at a transition from the smooth-walled, conical rod section 10 to the external thread 9 at the tip 14 of the tie rod 2. The wall thickness of the wall to be poured which is set by rotating the tie nut 3 on the tie rod 2 can be read from the scale 12. The wall thickness can be set in steps of one half a lead of the thread 8, by way of a half rotation of the tie nut 3.

Figure 2:
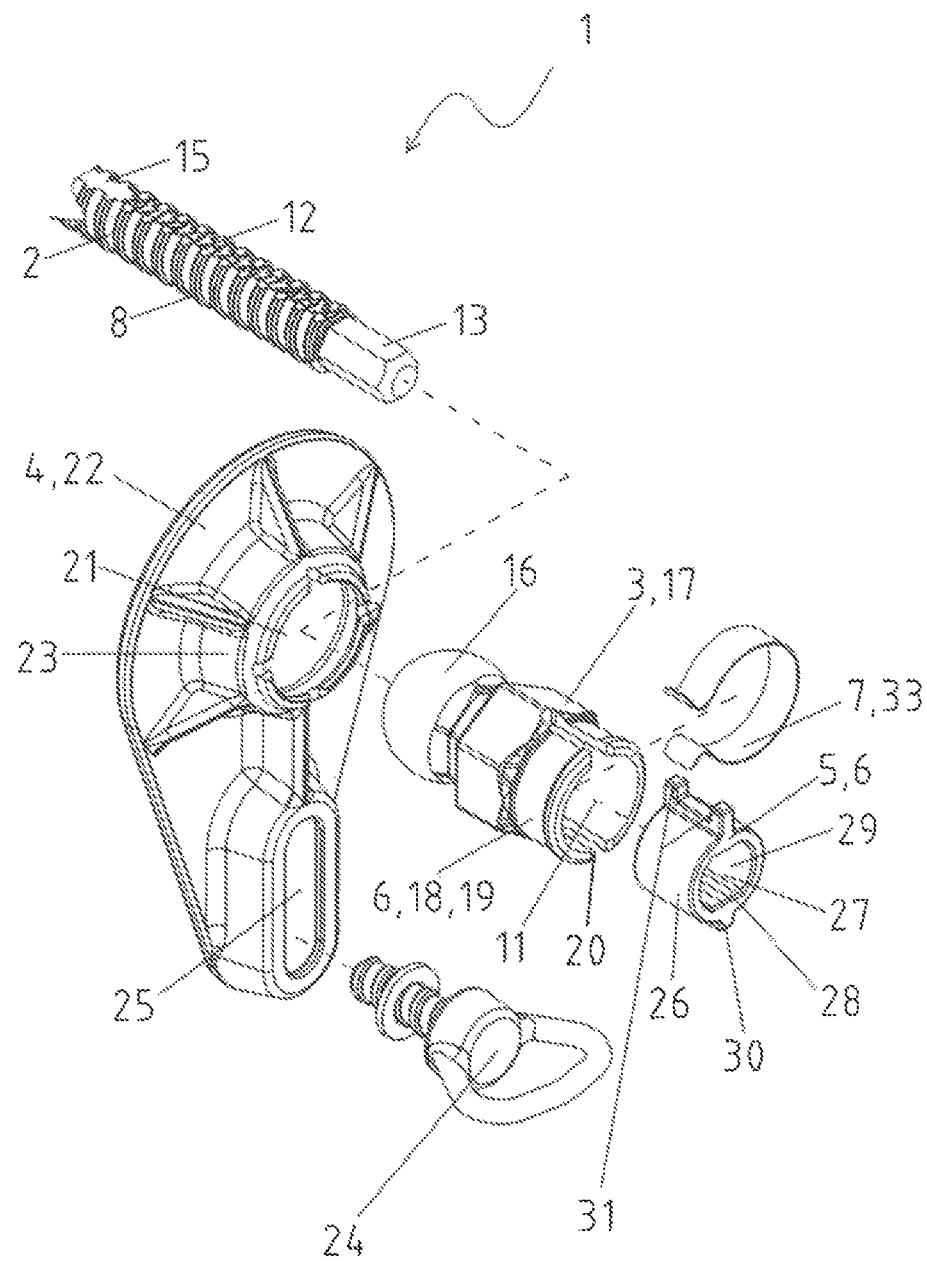
FIG. 2 shows a perspective exploded view of a tie nut, an anti-rotation element, and further parts of the formwork tie from FIG. 1 in an enlarged illustration.

The tie nut 3, which can be seen individually in FIG. 2, comprises a ball-shaped head 16, which is coaxially adjoined by a hexagon 17, which is adjoined by a cylindrical section 18 including a wide and flat circumferential groove 19. The coaxial through-hole 11 extends through the tie nut 3 over the entire length thereof, which is to say the ball-shaped head 16, the hexagon 17, and the cylindrical section 18. In the through-hole 11, the tie nut 3, in the region of the ball-shaped head 16 and the hexagon 17, includes the internal thread with which the tie nut can be screwed, or is screwed, onto the external thread 8 of the tie rod 2. The through-hole 11 is threadless in the region of the cylindrical section 18 and has a diameter which is greater than an outside diameter of the external thread 8 of the tie rod 2. The tie nut 3 includes two slots 20 in the region of the cylindrical section 18, at opposing circumferential locations in an axial plane of the tie nut 3. The slots 20 are open at the end face of the tie nut 3.

The abutment 4, which can likewise be seen individually in FIG. 2, comprises an abutment plate 22, a through-hole 21 for the tie rod 2, and a ball socket 23, which is coaxial to the through-hole 21, on a rear side of the abutment plate 22. The abutment 4 is mounted pivotably in all directions on the ball-shaped head 16 of the tie nut 3 by way of the ball socket 23. The abutment 4 can be attached with the abutment plate 22 at the rear side of one of the two formwork elements by way of an attachment screw 24, which is disposed in an elongated hole 25, which is radial to the through-hole 21, outside the ball socket 23.

The anti-rotation element 5, which can likewise be seen individually in FIG. 2, comprises a sleeve 26 including an axial through-hole 27, the cross-section of which is mirror opposite the cross-section of the tie rod 2 in the region of the external thread 8 onto which the tie nut 3 can be screwed or is screwed.

The cross-section of the through-hole 27 of the sleeve 26 of the anti-rotation element 5 comprises two parallel surfaces 28 at a distance of the parallel surfaces 15 of the tie rod 2, which are connected by two cylinder surfaces 29 having a diameter that corresponds to an outside diameter of the external thread 8 of the tie rod 2. The cross-section of the through-hole 27 of the sleeve 26 can also be slightly larger than the cross-section of the tie rod 2 in the region of the external thread 8, so that the anti-rotation element 5 has a clearance on the tie rod 2. The anti-rotation element 5 is axially displaceable in the region of the external thread 8 on the tie rod 2. The diametrically opposed shape of the cross-section of the through-hole 27 of the sleeve 26 of the anti-rotation element 5 holds the anti-rotation element 5 non-rotatably on the tie rod 2 by way of form fit with the cross-section of the tie rod 2 in the region of the external thread 8.

From the sleeve 26 of the anti-rotation element 5, a longitudinal rib 30 projects outwardly in an axial plane at a circumferential location. At an opposing circumferential location, two pins 31 project outwardly from the sleeve 26 in the same axial plane as the longitudinal rib 30. The axial distance of the two pins 31 corresponds to the width of the flat, circumferential groove 19 in the cylindrical section 18 of the tie nut 3.

The tie nut 3 including the slots 20 and the sleeve 26 of the anti-rotation element 5 including the longitudinal rib 30 and the pins 31 form the form fit coupling 6, which can be made to engage and disengage by axial movement of the anti-rotation element 5 with respect to the tie nut 3. The form fit coupling 6 is made to engage by axially displacing the anti-rotation element 5 on the tie rod 2 in the direction of the tie nut 3 and pushing the anti-rotation element into the through-hole 11 in the tie nut within the cylindrical section 18 thereof. In the process, the longitudinal rib 30 and the pins 31 find their way into the slots 20 in the cylindrical section 18 of the tie nut 3, whereby the tie nut 3 is non-rotatably connected to the anti-rotation element 5 by way of form fit of the longitudinal rib 30 and the pins 31 in the slots 20. Since the anti-rotation element 5 is non-rotatable on the tie rod 2, the tie nut 3 is likewise non-rotatable with respect to the tie rod 2 when the form fit coupling 6 has been made to engage as described. Due to the thread engagement at the external thread 8 of the tie rod 2, the tie nut 3 is axially fixed on the tie rod 2 when held non-rotatably with respect to the tie rod 2, which is to say when the form fit coupling 6 is engaged.

The form fit coupling 6 is made to disengage by axially pulling the sleeve 26 of the anti-rotation element 5 out of the tie nut 3, whereby the longitudinal rib 30 and the pins 31 of the sleeve 26 of the anti-rotation element 5 emerge from the slots 20 of the tie nut 3, such that the tie nut 3 is rotatable on the external thread 8 of the tie rod 2. By rotating the tie nut 3, the tie nut 3 can be set in the axial direction on the tie rod 2. In each instance, after a half revolution of the tie nut 3, the form fit coupling 6 can be made to engage, so that the tie nut 3 can be secured on the tie rod 2 in the axial direction of the tie rod 2 in increments of one half a lead of the external thread 8.

The slots 20 in the cylindrical section 18 of the tie nut 3 can, generally speaking, also be interpreted as cut-outs, and the longitudinal rib 30 and the pins 31 of the sleeve 26 of the anti-rotation mechanism element 25 can be interpreted as protrusions.

The securing element 7 comprises a strip-shaped spring clip 33, which extends cylindrically over more than 180° and less than 360°, and in the exemplary embodiment extends over approximately 270°, in a circumferential direction, the ends of which point outwardly in an obliquely diverging manner. When the form fit coupling 6 is engaged, which is to say, when the sleeve 26 of the anti-rotation element 5 is situated in the cylindrical section 18 of the tie nut 3, the spring clip 33 can be snapped radially onto or into the flat circumferential groove 19 in the cylindrical section 18 of the tie nut 3. The spring clip 33 passes between the two pins 31, which protrude outwardly from the sleeve 26 of the anti-rotation element 5, whereby the sleeve 26 of the anti-rotation element 5 is axially secured to prevent emergence from the cylindrical section 18 of the tie nut 3, and the form fit coupling 6 is held in engagement. The anti-rotation element 5 is released by rotating the spring clip 33 so as to have the opening thereof align with the pins 31, such that it can be pulled out of the tie nut 3. As an alternative for releasing the anti-rotation element 5, the spring clip 33 can be pulled radially out of the circumferential groove 19 of the tie nut 3.

So as to connect to one another the two non-illustrated formwork elements, which are disposed at a distance from one another, initially the thickness of the wall to be poured is set by rotating the tie nut 3 on the tie rod 2 and fixing this on the tie rod 2 by way of the anti-rotation element 5. The set wall thickness can be read from the scale 12. So as to fix the tie nut 3 on the tie bar 2, the sleeve 26 of the anti-rotation element 5 is pushed into the cylindrical section 18 of the tie nut 3, whereby, as described above, the longitudinal rib 30 and the pins 31 of the sleeve 26 of the anti-rotation element 5 enter the slots 20 in the cylindrical section 18 of the tie nut 3 and hold the tie nut 3 non-rotatably at the anti-rotation element 5. The form fit coupling 6 is engaged. So as to be able to push the sleeve 26 into the cylindrical section 18 of the tie nut 3, the tie nut 3 has to be rotated on the tie rod 2 so that the slots 20 thereof align with the longitudinal rib 30 and the pins 31 of the sleeve 26 of the anti-rotation element 5. For securing to prevent inadvertent release, the spring clip 33 of the securing element 7, which normally is not released from the tie nut 3, but is situated in the circumferential groove 18 of the tie nut 3, is rotated in the groove 18 so as to extend between the two pins 31 of the anti-rotation element 5, whereby the anti-rotation element 5 is held in the cylindrical section 18 of the tie nut 3. The spring clip 33 is held in the circumferential groove 18 by friction such as to prevent inadvertent rotation.

Thereafter, the tie rod 2 is placed, with the tip 14 thereof ahead, from the rear side of one of the two formwork elements through at least approximately mutually aligned insertion holes of the formwork elements, and is screwed into a tie nut, which is not shown, and attached on a rear side of another of the two formwork elements. If the rear side of the other formwork element is accessible, the tie nut can also be screwed onto the external thread 9 of the tie rod 2 that is placed through the two formwork elements. The abutment 4 is attached to the rear side of the formwork element by way of the attachment screw 24, the abutment being aligned by the ball-shaped head 16 of the tie nut 3 at the rear side of the formwork element.

The invention claimed is:

1. A formwork tie for connecting two formwork elements that are disposed opposite and at a distance from one another, comprising a tie rod including an external thread and a tie nut that is screwed onto the external thread, wherein the formwork tie comprises an anti-rotation element, which is non-rotatable and axially movable with respect to the tie rod, and the formwork tie comprises a releasable form fit coupling, by way of which the anti-rotation element can be releasably non-rotatably connected to the tie nut and be made to engage and disengage by an axial movement, wherein the anti-rotation element comprises a sleeve that is axially displaceable on the tie rod and that has an inner cross-section, corresponding to the cross-section of the tie rod, which holds the anti-rotation element non-rotatably on the tie rod by way of form fit.

2. The formwork tie according to claim 1, wherein the tie nut and the anti-rotation element comprise complementary parts of the form fit coupling.

3. The formwork tie according to claim 1, wherein the tie rod has a non-circular cross-section with an axially parallel planar surface, which holds the anti-rotation element non-rotatably at the tie rod by way of form fit.

4. The formwork tie according to claim 1, wherein the tie nut and the anti-rotation element include at least one cut-out and at least one protrusion, corresponding to the cut-out, at mutually facing end faces, which can be made to engage by an axial displacement of the anti-rotation element with respect to the tie nut, and non-rotatably connect the tie nut and the anti-rotation element to one another by way of form fit when these are engaged with one another.

5. The formwork tie according to claim 1, wherein the tie nut and/or the anti-rotation element include at least one slot extending in the longitudinal direction, which is open at the end face facing the anti-rotation element and/or the tie nut, and/or the anti-rotation element and/or the tie nut include at least one rib, complementary to the slot, which enters the slot by axial displacement of the anti-rotation element with respect to the tie nut, and non-rotatably connects the tie nut and the anti-rotation element to one another by way of form fit in the slot.

6. The formwork tie according to claim 1, wherein the form fit coupling can be made to engage at angular steps of 60°, 90°, 120°, 180° or 360°.

7. The formwork tie according to claim 1, wherein the formwork tie comprises a releasable and/or rotatable securing element, by way of which the form fit coupling can be held releasably in engagement.

8. The formwork tie according to claim 7, wherein the securing element comprises a spring clip, which can be snapped radially onto the tie nut and/or the anti-rotation element when the form fit coupling is engaged, and which connects the tie nut and the anti-rotation element to one another in an axially fixed manner by way of form fit when snapped onto the tie nut and the anti-rotation element.

9. A formwork tie for connecting two formwork elements that are disposed opposite and at a distance from one another, comprising a tie rod including an external thread and a tie nut that is screwed onto the external thread, wherein the formwork tie comprises an anti-rotation element, which is non-rotatable and axially movable with respect to the tie rod, and the formwork tie comprises a releasable form fit coupling, by way of which the anti-rotation element can be releasably non-rotatably connected to the tie nut and be made to engage and disengage by an axial movement, wherein the formwork tie comprises a releasable and/or rotatable securing element, by way of which the form fit coupling can be held releasably in engagement, and wherein the securing element can be rotated into a position on the tie nut in which no form fit exists in the axial direction between the tie nut and the anti-rotation element, so that the anti-rotation element can be released from the tie nut in the axial direction.

10. The formwork tie according to claim 1, wherein the tie rod includes a scale for a wall thickness of a wall to be poured which is set with the tie nut.

11. The formwork tie according to claim 10, wherein the scale corresponds to a reference plane at an established location in a longitudinal direction of the tie rod and to the tie nut.

\* \* \* \* \*